United States Patent
Qu et al.

(10) Patent No.: US 10,433,307 B2
(45) Date of Patent: Oct. 1, 2019

(54) DIVERSITY BASED RELAY FOR WIRELESS COMMUNICATIONS BETWEEN A HEAD-MOUNTED DISPLAY AND A CONSOLE

(71) Applicant: Facebook Technologies, LLC, Menlo Park, CA (US)

(72) Inventors: Qi Qu, Irvine, CA (US); Hongyu Zhou, Canoga Park, CA (US); Ganesh Venkatraman, San Jose, CA (US); Ryan Hamilton Brown, Palo Alto, CA (US); Lyle David Bainbridge, Redwood City, CA (US); Sam Padinjaremannil Alex, Dublin, CA (US); Ali Yazdan, San Francisco, CA (US); Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 69 days.

(21) Appl. No.: 15/492,814

(22) Filed: Apr. 20, 2017

(65) Prior Publication Data
US 2018/0309500 A1    Oct. 25, 2018

(51) Int. Cl.
*H04W 72/04* (2009.01)
*H04B 7/155* (2006.01)

(52) U.S. Cl.
CPC .... *H04W 72/0453* (2013.01); *H04B 7/15528* (2013.01)

(58) Field of Classification Search
CPC ............................ H04W 72/0453; H04B 7/155
See application file for complete search history.

(56) References Cited

U.S. PATENT DOCUMENTS

| | | | |
|---|---|---|---|
| 2004/0102222 A1* | 5/2004 | Skafidas | H04B 7/0491 455/562.1 |
| 2016/0094988 A1* | 3/2016 | Lee | H04L 9/0825 380/270 |
| 2016/0323898 A1* | 11/2016 | Jo | H04B 7/0617 |
| 2017/0311177 A1* | 10/2017 | Sarkissian | H04W 16/28 |
| 2017/0359116 A1* | 12/2017 | Hwang | |

* cited by examiner

*Primary Examiner* — Jianye Wu
(74) *Attorney, Agent, or Firm* — Fenwick & West LLP

(57) ABSTRACT

A head-mounted display (HMD) is wirelessly coupled to a console or a relay depending on the relative positions of the HMD, the console, and the relay. The HMD communicates wirelessly with the console using a beam that is oriented in a particular direction. As the position of the HMD changes, the quality of the communication link between the HMD and the console may degrade. In response to the degradation, the HMD forms a communication link with a relay, which operates as an intermediary between the HMD and the console. The relay communicates with the HMD over a dedicated communication channel that is isolated from the communication channel over which the relay communicates with the console.

20 Claims, 4 Drawing Sheets

DIVERSITY BASED RELAY FOR WIRELESS COMMUNICATIONS BETWEEN A HEAD-MOUNTED DISPLAY AND A CONSOLE

BACKGROUND

The present disclosure generally relates to virtual and augmented reality systems, and specifically relates to a diversity based relay for wireless communications between a head-mounted display and a console.

It is desirable to establish a reliable and fast wireless communication between a console and a head-mounted display (HMD) in a virtual reality (VR) system, an augmented reality (AR) system, a mixed reality (MR) system, or some combination thereof, to, e.g., "cut the cord" between the console and the HMD. A wireless communication based on extremely high carrier frequencies, such as communication based on 60 GHz carrier frequency in accordance with the IEEE 802.11ad standard or the IEEE 802.11ay standard represents a promising technology for achieving reliable wireless experience in VR, AR and MR systems.

A base station (e.g., console) that wirelessly communicates with a client (e.g., HMD) based on 60 GHz carrier frequency employs beam forming to compensate for a path loss and maintain a quality of wireless link above a predetermined threshold value. In some scenarios, the beam scanning range of the console is limited (by the phase array capability) such that a high quality line-of-sight wireless link cannot be formed or maintained if the HMD moves out of range. Since many VR, AR, and MR systems rely on an experience where a wearer of the HMD can freely move in a large area, the loss or degraded quality of the wireless link makes for a choppy and undesirable user experience.

SUMMARY

Disclosed embodiments support a head-mounted display (HMD) that is wirelessly coupled to a console or a relay depending on the relative positions of the HMD, the console, and the relay. The HMD and the console may be part of a wireless virtual reality (VR) system, a wireless augmented reality (AR) system, a wireless mixed reality (MR) system, or some combination thereof. The HMD communicates wirelessly with the console using a beam that is oriented in a particular direction. As the position of the HMD changes, the quality of the communication link between the HMD and the console may degrade. In response to the degradation, the HMD forms a communication link with a relay, which operates as an intermediary between the HMD and the console.

The relay includes a radio-frequency (RF) circuit that enables bi-directional receive, amplify, and forward functionality of data packets being transmitted between the console and the HMD. Further, the relay uses dual frequency band or dual polarization for connecting and communicating with the console and the HMD. In particular, the relay connects with the console 104 via a first band or a first polarization and connects with the HMD via a second band or a second polarization. In one embodiment, the HMD uses the first band or a first polarization to connect with the console 104 when the relay is not in operation. When the relay is in operation, the HMD uses second band or second polarization to connect with the relay, and the relay uses the first band or the first polarization to connect with the console.

The FIGURES depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments support a head-mounted display (HMD) that is wirelessly coupled to a console or a relay depending on the relative positions of the HMD, the console, and the relay. The HMD and the console may be part of a wireless virtual reality (VR) system, a wireless augmented reality (AR) system, a wireless mixed reality (MR) system, or some combination thereof. The HMD communicates wirelessly with the console using a beam that is oriented in a particular direction. As the position of the HMD changes, the quality of the communication link between the HMD and the console may degrade. In response to the degradation, the HMD forms a communication link with a relay, which operates as an intermediary between the HMD and the console.

Figure 1:
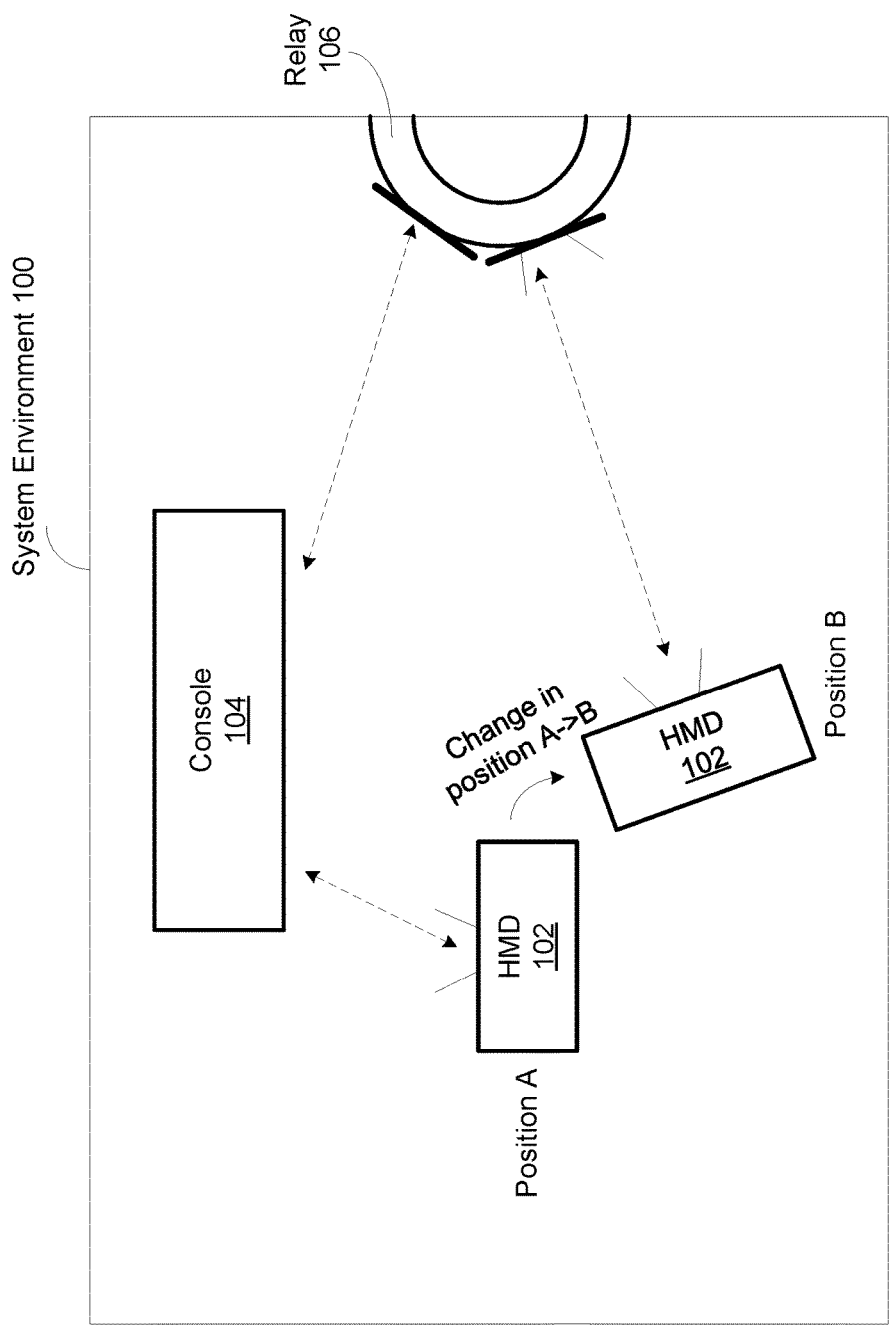
FIG. 1 is a system environment including a head-mounted display (HMD), a console, and a relay, in accordance with an embodiment.

FIG. 1 is a system environment 100 including a head-mounted display (HMD) 102, a console 104, and a relay 106, in accordance with an embodiment. The system environment 100 may be a VR system environment, an AR system environment, a MR system environment, or some combination thereof. While FIG. 1 shows one HMD 102 and one relay 106, in other embodiments any number of these components may be included in the system environment 100. For example, there may be multiple HMDs 102 that each communicate with the console 104. Additionally, functionality described in conjunction with one or more of the components shown in FIG. 1 may be distributed among the components in a different manner than described in conjunction with FIG. 1 in some embodiments.

The HMD 102 is a head-mounted display that presents content to a user comprising virtual and/or augmented views of a physical, real-world environment with computer-generated elements (e.g., 2D or 3D images, 2D or 3D video, sound, etc.). In some embodiments, the presented content includes audio that is presented via an external device (e.g., speakers and/or headphones) that receives audio information from the HMD 102, the console 104, or both, and presents audio data based on the audio information. The HMD 102 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

Figure 2:
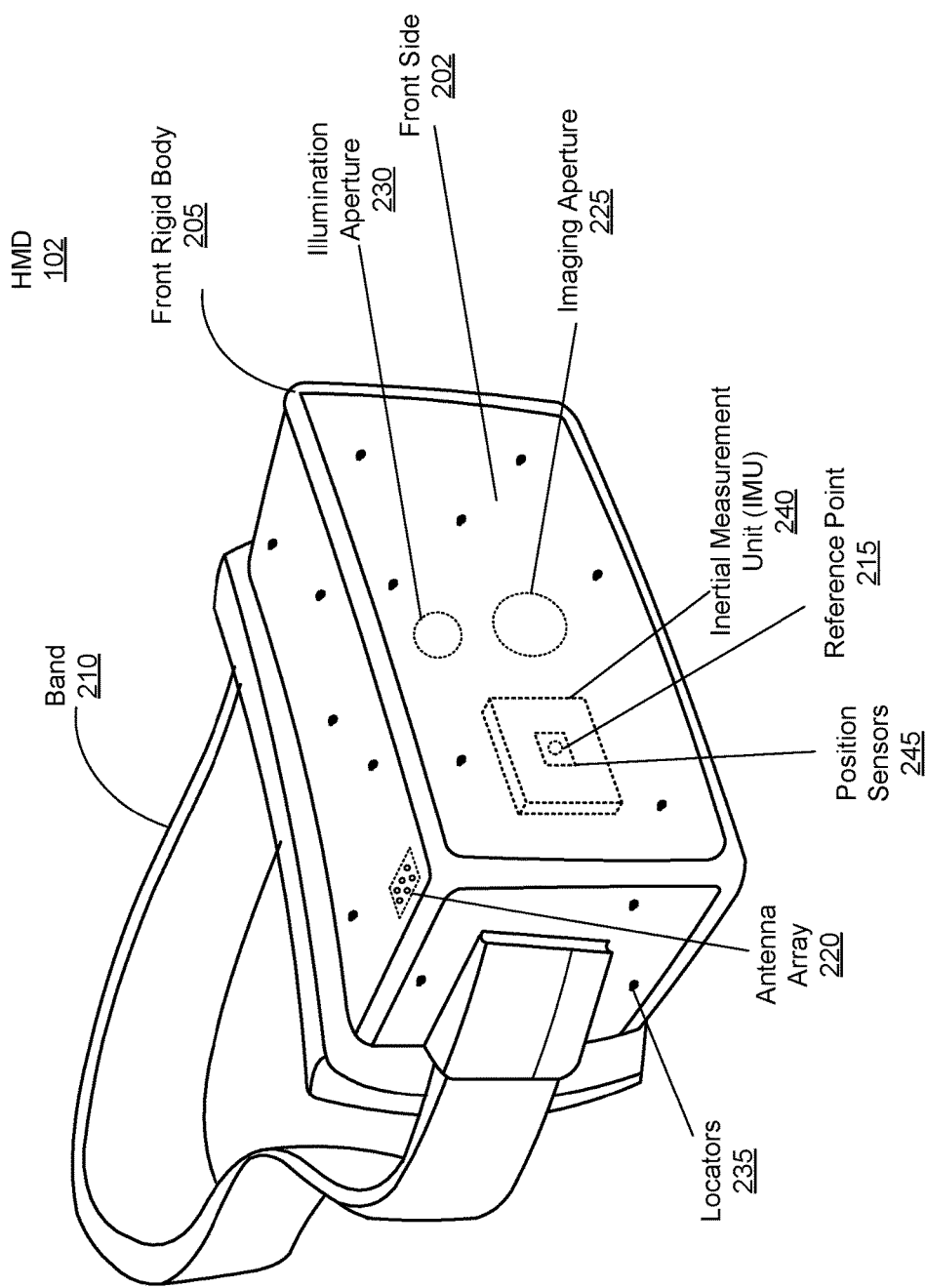
FIG. 2 is a detailed diagram of the HMD of FIG. 1, in accordance with an embodiment.

FIG. 2 is a detailed diagram of the HMD 102 of FIG. 1, in accordance with an embodiment. Portions of a front side 202 of the HMD 102 are at least partially transparent in the visible band (~380 nm to 750 nm), and portions of the HMD 102 that are between the front side 202 of the HMD 102 and an eye of the user are at least partially transparent (e.g., a partially transparent electronic display). The HMD 102 includes a front rigid body 205, a band 210, a reference point 215, and an antenna array 220. In some embodiments, the antenna array 220 integrated into the front rigid body 205 comprises multiple phased-array antennas, which may be used for wireless communication with the console 104 based on beam forming. The HMD 102 wirelessly communicates with the console 104 in different beam directions using the phased-array antennas of the antenna array 220. In alternate embodiments, the antenna array 220 comprises one or more antennas configured to cover different regions of space, i.e., sectors and/or beams, to achieve beam forming communication between the HMD 102 and the console 104.

In some embodiments, the HMD 102 also includes a depth camera assembly (DCA) configured to determine depth information of a local area surrounding some or all of the HMD 102. In these embodiments, the HMD 102 includes an imaging aperture 225 and an illumination aperture 230, and an illumination source of the DCA would emit light (e.g., structured light) through the illumination aperture 230. An imaging device of the DCA would capture light from the illumination source that is reflected/scattered from the local area through the imaging aperture 225. In some embodiments, the HMD 102 also includes one or more locators 235. The locators 235 are objects located in specific positions on the HMD 102 relative to one another and relative to the reference point 215. A locator 235 may be a light emitting diode (LED), a corner cube reflector, a reflective marker, a type of light source that contrasts with an environment in which the HMD 102 operates, or some combination thereof.

In one embodiment, the front rigid body 205 includes one or more electronic display elements, one or more integrated eye tracking systems, an Inertial Measurement Unit (IMU) 240, one or more position sensors 245, and the reference point 215. The position sensors 245 may be located within the IMU 240, and neither the IMU 240 nor the position sensors 245 are visible to a user of the HMD 102. The IMU 240 is an electronic device that generates fast calibration data based on measurement signals received from one or more of the position sensors 245. A position sensor 245 generates one or more measurement signals in response to motion of the HMD 102. Examples of position sensors 245 include: one or more accelerometers, one or more gyroscopes, one or more magnetometers, another suitable type of sensor that detects motion, a type of sensor used for error correction of the IMU 240, or some combination thereof. The position sensors 245 may be located external to the IMU 240, internal to the IMU 240, or some combination thereof.

In some embodiments, the HMD 102 utilizes measurement data obtained from at least one of: the DCA, the locators 235, the IMU 240 and the position sensors 245 to determine and track a position and/or orientation of the HMD 102 relative to a specific reference point on the console that wirelessly communicates with the HMD 102. The HMD 102 may include one or more processors (not shown in FIG. 1) configured to translate the determined and tracked relative position of the HMD 102 into information about a preferred direction for a beam for wireless communication with the console 104. In one or more embodiments, the antenna array 220 may use the beam with the preferred direction to communicate over a wireless link with the console 104.

Referring back to FIG. 1, the console 104 provides content to the HMD 102 for processing and/or display. In one embodiment, the console 104 receives position information, acceleration information, velocity information, predicted future positions, or some combination thereof, of the HMD 102. Based on the received information, the console 104 determines content to provide to the HMD 102 for presentation to the user. For example, if the received information indicates that the user has looked to the left, the console 104 generates content for the HMD 102 that mirrors the user's movement in a virtual environment or in an environment augmenting the local area with additional content. Additionally, the console 104 executes one or more applications and may provide feedback to a user related to the execution of the applications. The feedback may be visual or audible feedback via the HMD 102 or haptic feedback.

As discussed above, the console 104 and the HMD 102 communicate wirelessly. In one embodiment, the console 104 uses at least one wide beam (i.e., tapering) to communicate with the HMD 102. The wide beam alleviates the requirement for beam tracking at the console 104. In an alternate embodiment, the console 104 may use a narrow beam when wirelessly communicating with the HMD 102. In contrast, the HMD 102 uses a narrow beam to maintain link gain when wirelessly communicating with the console 104.

The HMD 102 performs beam training to identify a beam over which packets of data may be wirelessly communicated between the HMD 102 and the console 104. For example, the HMD 102 transmits a data packet to the console 104 using a first directional narrow beam of a plurality of directional narrow beams of the HMD 102. During transmission of the data packet, a user of the HMD may move relative to a specific reference point on the console 104. Before switching a directional narrow beam for communication with the console 104, the HMD 102 may perform beam training in order to determine a preferred directional narrow beam for wireless communication with the console 104.

In some embodiments, the HMD 102 performs beam training by employing beam level sweep during a beam training period when the HMD 102 transmits packets to the console 104 using various directional narrow beams. The console 104 receives the packets transmitted using different directional narrow beams and sends feedback to the HMD 102 indicating a preferred directional narrow beam that provides a best link quality among the different directional narrow beams. Based on the feedback, the HMD 102 determines a new preferred directional narrow beam for communication with the console, which ensures that a quality of communication link between the HMD 102 and the console 104 is above a predetermined threshold value.

As the user of the HMD 102 moves relative to the console 104, there may be degradation in the quality of communication link between the HMD 102 and the console 104. A low quality of communication link also causes a data rate lower than a minimum threshold and loss of packets between the HMD 102 and the console 104. The degradation in the quality of the communication link may be detected by the HMD 102 or the console 104. In some embodiments, in addition to a lower data rate or loss of packets, the degradation in the quality of the communication link may be identified based on other system information, such as the HMD 102 using an edge beam of the directional beams to communicate with the console 104. The degradation in quality of the communication link may be used as a signal for imitating a new beam training between HMD 102, console 104, and relay 106.

The HMD 102 may repeatedly perform beam training in order to determine a new preferred directional narrow beam for wireless communication with the console 104 when the quality of the communication link between the HMD 102 and the console 104 degrades. In some cases, the position of the HMD 102 relative to the console 104 is such that a high quality communication link between the HMD 102 and the console 104 cannot be formed. In the illustration in FIG. 1, the HMD 102, at position A, can form a high quality communication link with the console 104, but, at position B, can no longer form a high quality communication link because of the directionality of the HMD 102 at position B. When a high quality communication link cannot be formed between the HMD 102 and the console 104, the HMD 102 may attempt to communicate with the console 104 via the relay 106. Before switching to relay 106, a beam training session is performed to determine whether to switch to relay and, if there are multiple relays, which relay to switch to. A system level protocol can be implemented to facilitate the beam training session, such as IEEE 802.11ad protocol. After the beam training session, the HMD 102 compares the beam metrics from relay 106 and console 104 to determine whether to switch. For example, if both console 104 and relay 106 use multiple transmit beams each, and HMD 102 uses a single (potentially wide, such as quasi-omni) receive beam for the training session, at the end of the session, HMD 102 makes a determination to switch to the entity (i.e., console 104 or relay 106) which has higher average received signal strength among all the transmit beams. Other statistic or non-statistic metrics may be used as well.

The relay 106 is a device that operates as an intermediary between the HMD 102 and the console 104 when the HMD 102 and the console 104 are not able to form a direct high quality communications link. In one embodiment, the system environment 100 may be configured with multiple relays 106 to improve the overall quality of the wireless communication as the HMD 102 moves around the environment. In one embodiment, the relay 106 includes a digital signal processing (DSP) core for time-syncing with a transceiver in the console 104. The time-syncing enables the relay 106 to determine the overall timing of the wireless communications between the relay 106 and the console 104 and, for example, the beacon intervals. In other embodiments, the timing information may be determined using an out-of-band method, for example, Bluetooth; thus, the DSP core is not needed to perform time-syncing.

The relay 106 includes at least two antennas or antenna arrays—one antenna or antenna array facing the console 104 and one antenna or antenna array facing a possible direction of the HMD 102. The antenna or antenna array facing the console 104 may be manually tuned (for example, using a gimbal) or electronically tuned using a beam training process may be performed between the relay 106 and the console 104 when the relay is installed into the system environment 100. In one embodiment, the relay 106 uses two antenna arrays to communicate with the console 104—one antenna array for transmitting data packets and one antenna array for receiving data packets. Similarly, the relay 106 uses two antenna arrays to communicate with the HMD 102—one antenna array for transmitting data packets and one antenna array for receiving data packets. In an alternative embodiment, the relay 106 uses one antenna array to communicate with the console 104 for both receiving and transmitting data packets. Similarly, the relay 106 uses one antenna array to communicate with the HMD 102 for both receiving and transmitting data packets. In such an embodiment, the relay includes a DSP core to switch between receiving and transmitting data packets on the antenna array.

To communicate with the HMD 102 and the console 104 via the antenna or antenna arrays, the relay 106 includes a radio-frequency (RF) circuit that enables bi-directional receive, amplify, and forward functionality of data packets being transmitted between the console 104 and the HMD 102. Further, the relay 106 uses dual band or dual polarization for connecting and communicating with the console 104 and the HMD 102. In particular, the relay 106 connects with the console 104 via a first band or a first polarization and connects with the HMD 102 via a second band or a second polarization. In one embodiment, the HMD 102 uses the first band or a first polarization to connect with the console 104 when the relay is switched off. When the relay 106 is switched on, the HMD 102 uses second band or second polarization to connect with the relay 106, and the relay 106 uses the first band or the first polarization to connect with the console 104.

To enable the seamless transition of communication between the HMD 102, the console 104, and the relay 106, at least the following steps are performed: (1) identifying a degradation in the quality of the communication link between the HMD 102 and the console 104, (2) switching communications to/from the HMD 102 to the relay 106 instead of the console 104 and to/from the console 104 to the relay 106 instead of the HMD 102, and (3) monitoring the quality of the communication link between the HMD 102 and the relay 106 to determine whether further switching is necessary. Details regarding these steps are discussed below.

Figure 3:
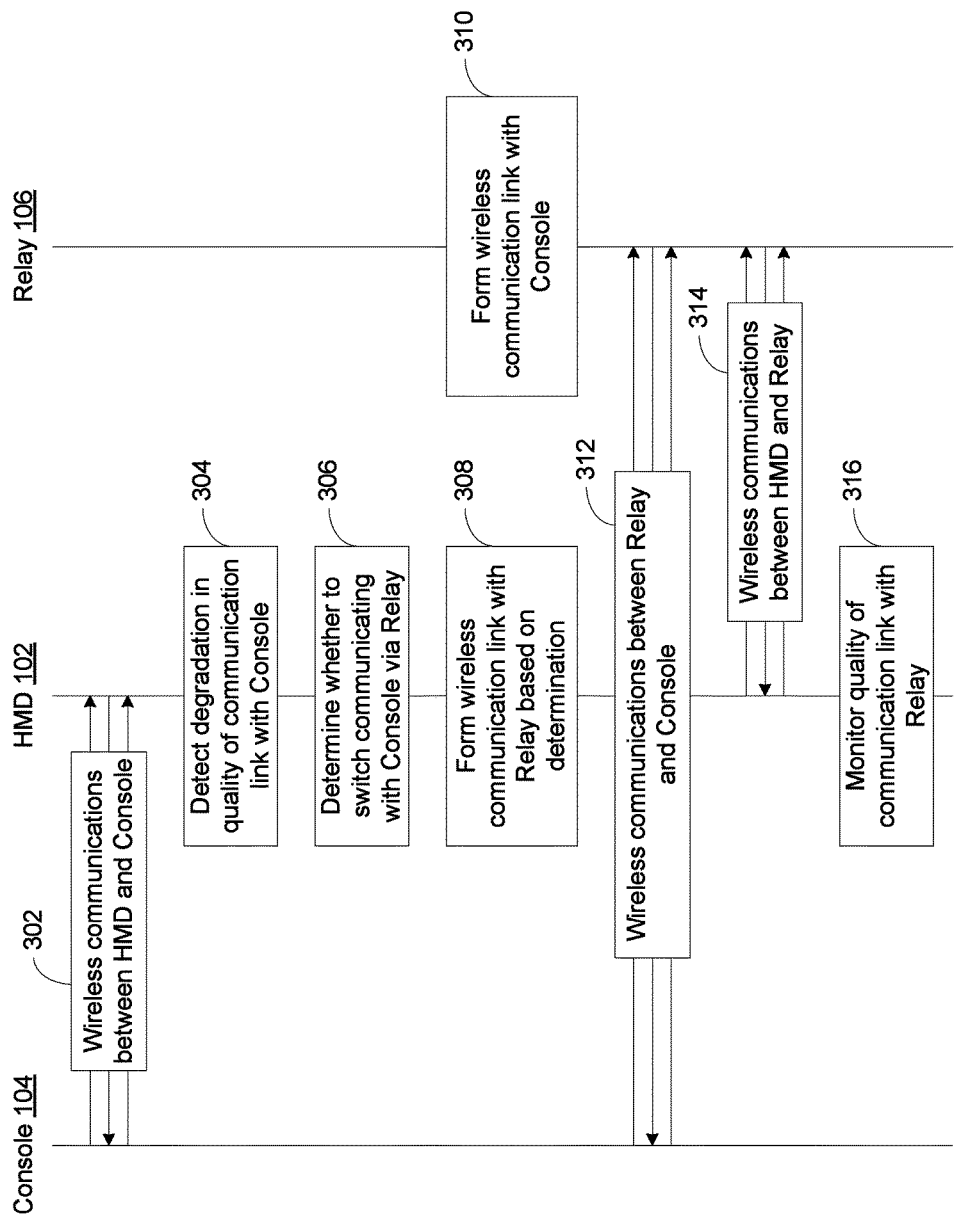
FIG. 3 is a process diagram illustrating a process of switching communications to a relay in response to communication quality degradation, in accordance with an embodiment.

FIG. 3 is a process diagram illustrating a process of switching communications to a relay in response to communication quality degradation, in accordance with an embodiment. Other embodiments may perform the steps of the process illustrated in FIG. 3 in different orders and can include different, additional and/or fewer steps. The steps of the process may be performed by any suitable entity.

At 302, the console 104 and the HMD 102 wirelessly communicate over a communication link. In operation, to create the communication link, the HMD 102 performs beam training to identify a beam over which packets of data may be wirelessly communicated between the HMD 102 and the console 104. The HMD 102 then uses the identified beam to transmit and receive data packets to/from the console 104.

At 304, the HMD 102 detects degradation in the quality of the communication link with the console 104. The degradation may be caused by the HMD 102 moving from a position where a high quality communication link to the console 104 may be formed to a position where such a link to the console 104 cannot be formed. The HMD 102 detects the degradation based on system factors such as a data rate or a signal-to-noise ratio (SNR) falling below a minimum threshold, loss of data packets transmitted by the HMD 102 or the console 104 and not received by the intended recipient. The additional information, such as the communication link using an edge beam of a set of available beams, can be used to identify that a training should be initiated to identify whether to enable the relay. The beam training process may be performed in a variety of ways. For example the IEEE 802.11ad protocol may be used to perform the beam training process. In alternative embodiments, the console 104, instead of the HMD 102 or in conjunction with the HMD 102, detects the degradation in the quality of the communication link.

At 306, the HMD 102 determines based on the beam training result whether to switch to communicating with the console 104 via the relay 106. In operation, the HMD 102 determines via the beam training process discussed above whether beam statistic performance of console 104 is better than beam statistic performance of relay 106. If a determination is made that beam static performance of console 104 is better than beam static performance of relay 106, the HMD 102 determines whether another beam that improves the quality of wireless communication with the console 104 is available. In such a case, the HMD 102 switches to the identified beam and continues to directly communicate with the console 104. In the case where beam statistic performance of relay 106 is better than that of console 104, the HMD 102 switches to the relay with the best beam identified. The remaining discussion focuses on the scenario where a communication link between the HMD 102 and the relay 106 can be formed.

At 308, the HMD 102 forms a wireless communication link with the relay 106. In one embodiment, the HMD 102 uses the first band or a first polarization to connect with the console 104 when the relay is switched off. When the HMD 102 switches to communicating via the relay 106, the HMD 102 uses a second band or second polarization to connect with the relay 106.

At 310, the relay 106 forms a wireless communication link with the console 104. In one embodiment, the relay 106 performs beam training to identify a beam for communicating with the console 104. In alternative embodiment, because the position of the relay 106 is fixed, beam training with the console 104 is only performed at installation and, during switching, the relay 106 uses the pre-identified beam for communicating with the console 104. The relay 106 uses the first band or the first polarization to communicate with the console 104. Because the HMD 102 and the console 104 use different bands or polarizations for communicating with the relay 106, the relay 106 can reduce the coupling between transmission and receipt signals and the link between the console 104 and relay 106 has reduced or zero interference with the link between relay 106 and HMD 102.

At 312, the console 104 and the relay 106 wirelessly communicate over the communication link formed at 310. At 314, the HMD 102 and the relay 106 wirelessly communicate over the communication link formed at 308. In operation, the relay 106 forwards data packets received from the console 104 to the HMD 102 and forwards data packets received from the HMD 102 to the console 104.

At 316, the HMD 102 continues to monitor the quality of the communication link with the relay 106. In a scenario where the quality degrades, the HMD 102 may identify a different beam for communicating with the relay 106 or may switch to communicating directly with the console 104 depending on the position of the HMD 102. More specifically, when HMD 102 or console 104 detects an event triggering new beam training, the default or defined beam training protocol can still be used as if there is no relay 106 in between HMD 102 and console 104. The console 104 can still send out training packets following the same protocol as if the console 104 were talking to HMD 102 directly. In one embodiment, if the relay 106 uses only one beam (potentially wide beam) to communicate to HMD 102, all the training fields associated with the packet from console 104 will be using said beam. Furthermore, a DSP core may not be used at relay 106 to control beam switching at the relay. In another embodiment, if the relay 106 uses more than one beam to communicate with HMD 102, the relay 106 identifies when to switch between the beams being used at the training field boundary.

In such a manner, the HMD 102 can seamlessly switch between communicating with the console 104 directly or via the relay 106. Further, because the relay 106 communicates with the HMD 102 and the console 104 on different polarizations or bands, there is minimal interference between the communications to/from the HMD 102 and the console 104.

Figure 4A:
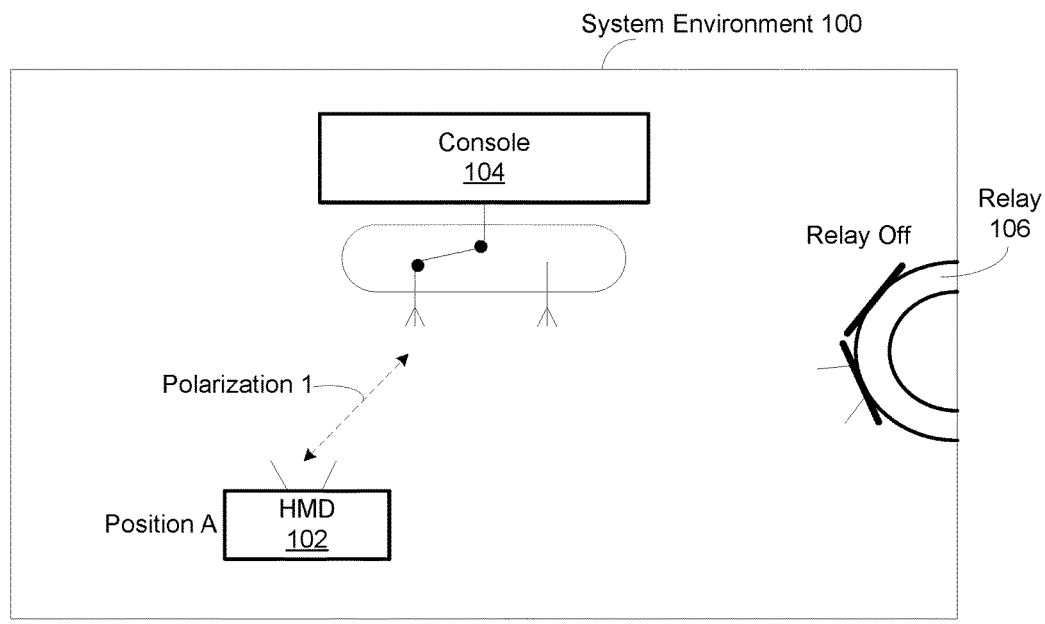
FIGS. 4A and 4B illustrate a configuration of the console when a single frequency band is available for communication with the HMD and the relay, in accordance with an embodiment.
Figure 4B:
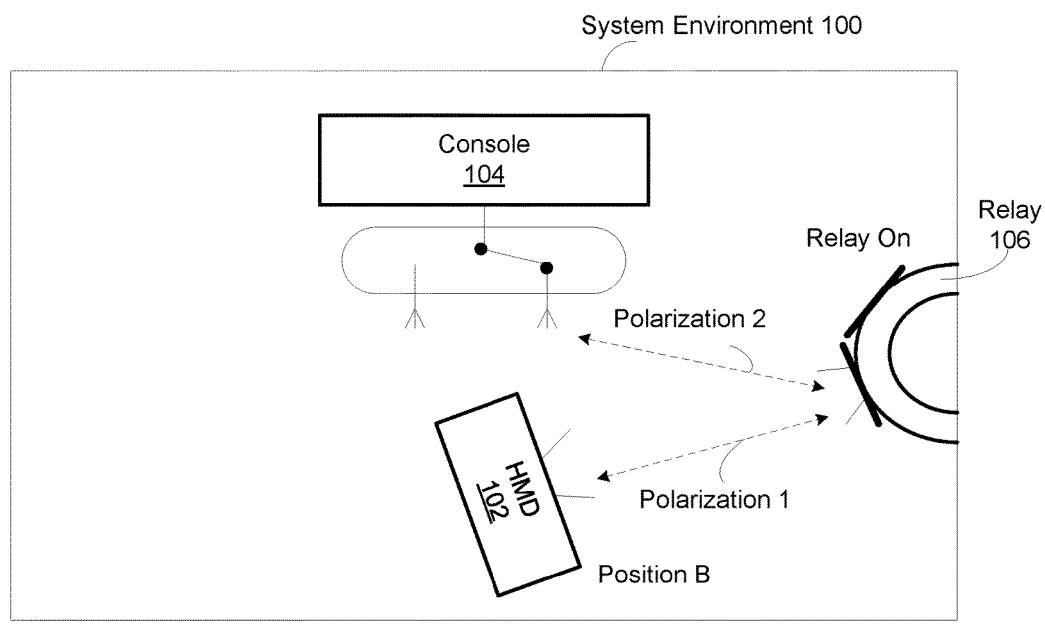

FIGS. 4A and 4B illustrate a configuration of the console 104 when only a single frequency band is available for communication with the HMD 102 and the relay 106, in accordance with an embodiment. In the illustrated configuration, the console 104 implements two polarizations—polarization 1 and polarization 2. The console 104 uses one polarization to communicate with the HMD 102, and a different polarization to communicate with the relay 106. When the relay is not in use, as illustrated in FIG. 4A, the console communicates with the HMD 102 using polarization 1. When the relay is in use, as illustrated in FIG. 4B, the console communicates with the relay 106 using polarization 2. The relay 106 uses polarization 1 to communicate with the HMD 102. Switching between polarizations in such a manner enables the console 104 to reduce the interference to the HMD 102 while still communicating on the same frequency band.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising:
  receiving, by a head-mounted display, a first set of data packets from a console, the head-mounted display in direct communication with the console;
  detecting a degradation in quality of wireless communication between the console and the head-mounted display;
  identifying a relay with which the head-mounted display can wirelessly communicate, the relay configured to wirelessly communicate with the head-mounted display using a first communication channel and configured to wirelessly communicate with the console using a second communication channel that is isolated from the first communication channel;
  initiating wireless communication between the head-mounted display and the relay using the first communication channel; and
  receiving, by the head-mounted display, a second set of data packets from the relay via the first wireless communication channel, the second set of data packets received at the relay from the console using the second communication channel, wherein the console is in direct communication with the relay via the second communication channel.

2. The method of claim 1, wherein detecting the degradation comprises determining that a rate of data transmission or a signal-to-noise ratio (SNR) between the console and the head-mounted display has fallen below a minimum threshold.

3. The method of claim 1, wherein detecting the degradation comprises determining that one or more data packets transmitted by the console were not received by the head-mounted display.

4. The method of claim 1, wherein head-mounted display communicates with the console via one of a plurality of beams, and detecting the degradation comprises determining that the head-mounted display is communicating with the console via an edge beam of the plurality of beams.

5. The method of claim 1, wherein identifying the relay comprising performing one or more beam training operations to determine that the head-mounted display can wirelessly communicate with the relay.

6. The method of claim 1, wherein the first communication channel uses first frequency band and a second communication channel uses a second frequency band.

7. The method of claim 1, wherein the first communication channel uses a first polarization and a second communication channel uses a second polarization.

8. The method of claim 1, wherein, prior to initiating the wireless communication between the head-mounted display and the relay, the wireless communication between the console and the head-mounted display uses a first polarization.

9. The method of claim 8, wherein, after initiating the wireless communication between the head-mounted display and the relay, the first communication channel uses the first polarization and the second communication channel uses a second polarization.

10. The method of claim 1, wherein identifying the relay comprises selecting the relay from a set of available relays based on a position of the head-mounted display relative to the relay.

11. A head-mounted display, comprising:
  an antenna array;
  a radio frequency integrated circuit configured to:
    receive a first set of data packets from a console, the head-mounted display in direct communication with the console,
    detect a degradation in quality of wireless communication between a console and a head-mounted display,
    identify a relay with which the head-mounted display can wirelessly communicate, the relay configured to wirelessly communicate with the head-mounted display via the antenna array using a first communication channel and configured to wirelessly communicate with the console using a second communication channel that is isolated from the first communication channel;
    initiate wireless communication between the head-mounted display and the relay using the first communication channel; and
    receive a second set of data packets from the relay via the first wireless communication channel, the second set of data packets received at the relay from the console using the second communication channel, wherein the console is in direct communication with the relay via the second communication channel.

12. The head-mounted display of claim 11, wherein the radio frequency integrated circuit detects the degradation by determining that the rate of data transmission or a signal-to-noise ratio (SNR) between the console and the head-mounted display has fallen below a minimum threshold.

13. The head-mounted display of claim 11, wherein the radio frequency integrated circuit detects the degradation by determining that one or more data packets transmitted by the console were not received by the head-mounted display.

14. The head-mounted display of claim 11, wherein the head-mounted display communicates with the console via one of a plurality of beams, and the radio frequency integrated circuit detects the degradation by determining that the head-mounted display is communicating with the console via an edge beam of the plurality of beams and determining that a link quality between the head-mounted display and the console is degrading.

15. The head-mounted display of claim 11, wherein the radio frequency integrated circuit identifies the relay by performing one or more beam training operations to determine that the head-mounted display can wirelessly communicate with the relay.

16. The head-mounted display of claim 11, wherein the radio frequency integrated circuit identifies the relay by selecting the relay from a set of available relays based on a position of the head-mounted display relative to the relay.

17. A relay, comprising:
a first antenna array facing a console;
a second antenna array facing an anticipated position of a head-mounted display; and
a radio-frequency (RF) circuit that is configured to:
form a first communication channel with the console and a second communication channel with the head-mounted display, the first communication channel being isolated from the second communication channel, the RF circuit in direct communication with the console via the first communication channel, and the RF circuit in direct communication with the head-mounted display via the second communication channel,
receive data packets from the console using the first communication channel, and
forward the received data packets to the head-mounted display using the second communication channel.

18. The relay of claim 17, wherein the first communication channel uses first frequency band and a second communication channel uses a second frequency band.

19. The relay of claim 18, wherein the first communication channel uses a first polarization and a second communication channel uses a second polarization.

20. The relay of claim 19, further comprising a digital signal processing core configured to time-sync with a transceiver in the console.

* * * * *